INVENTOR.
RAY BACCHI
BY Lothrop + West
ATTORNEYS

Oct. 13, 1959   R. BACCHI   2,908,182
VALVE OPERATOR
Filed Aug. 4, 1955   2 Sheets-Sheet 2
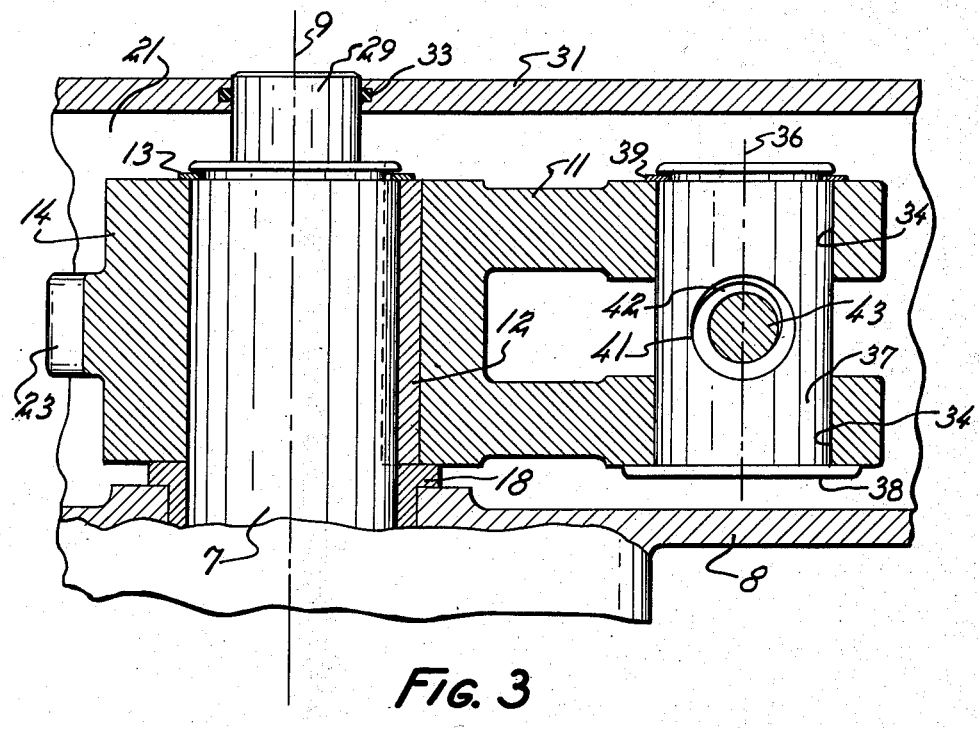
Fig. 3
Fig. 4
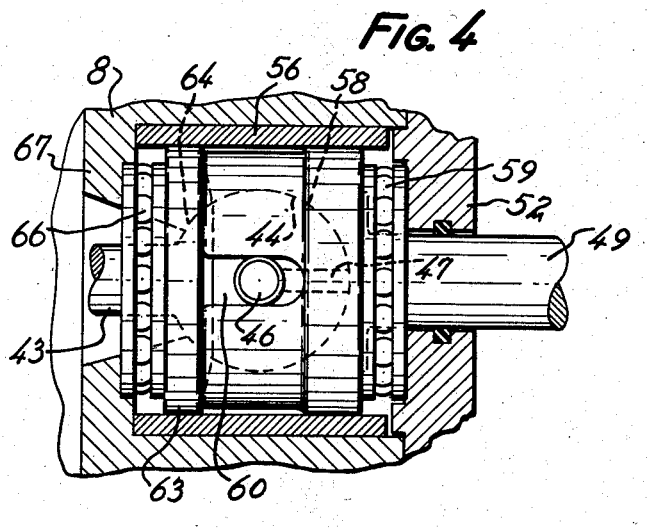
INVENTOR.
RAY BACCHI
BY Lothrop & West
ATTORNEYS United States Patent Office 2,908,182
Patented Oct. 13, 1959

2,908,182

VALVE OPERATOR

Ray Bacchi, Daly City, Calif., assignor, by mesne assignments, to Baldwin-Lima-Hamilton Corporation, Philadelphia, Pa., a corporation of Pennsylvania Application August 4, 1955, Serial No. 526,465

5 Claims. (Cl. 74—509)

My invention relates to means for moving valves in their housings, particularly to a means especially useful with a valve having a rotatable shaft which must be turned through a part of a rotation in order to move the valve between open and closed positions.

There is a distinct need for a simple, reliable and effective operator for valves of intermediate sizes. Usually the valve motion is imparted by an attendant although in some instances power devices are utilized. Customarily, the attendant rotates a hand wheel or crank and the motion train is of necessity provided with some sort of reduction mechanism since the valve being controlled is normally much too heavy for direct manual actuation. These factors have led to the production of various appropriate mechanisms, all of which are generally satisfactory but which usually incorporate so much expensive machinery, including finely finished wearing parts, that the cost of the operator is relatively high compared with the cost of the valve itself. There are often included in the motion train parts which are subjected to relatively high stresses and so are susceptible to relatively rapid wear and frequent replacement.

It is therefore an object of my invention to provide a valve operator of a design economical to manufacture.

Another object of my invention is to provide a valve operator which complies with the requisite factors, yet is of long life and relatively low loading.

Another object of my invention is to provide a valve operator which can be readily fabricated in the customary shop and can be readily serviced by the usual attendants.

A still further object of my invention is to provide a valve operator which is applicable to valves of various sizes over a wide range without substantial design change in the operator itself.

A still further object of my invention is to provide a generally improved valve operator.

While the valve operator of my invention has been incorporated in a number of different fashions, it has with particular success been made as described in the accompanying description and as illustrated in the accompanying drawings, in which Figure 1 is a cross section on a median transverse plane through the valve operator.

Figure 3 is a cross section to an enlarged scale of the valve lever and associated mechanism, the plane of section being indicated by the line 3—3 of Figure 1.

Figure 4 is a cross section on a diametrical plane showing the universal joint and attendant mechanism in side elevation and to an enlarged scale.

Figure 1:
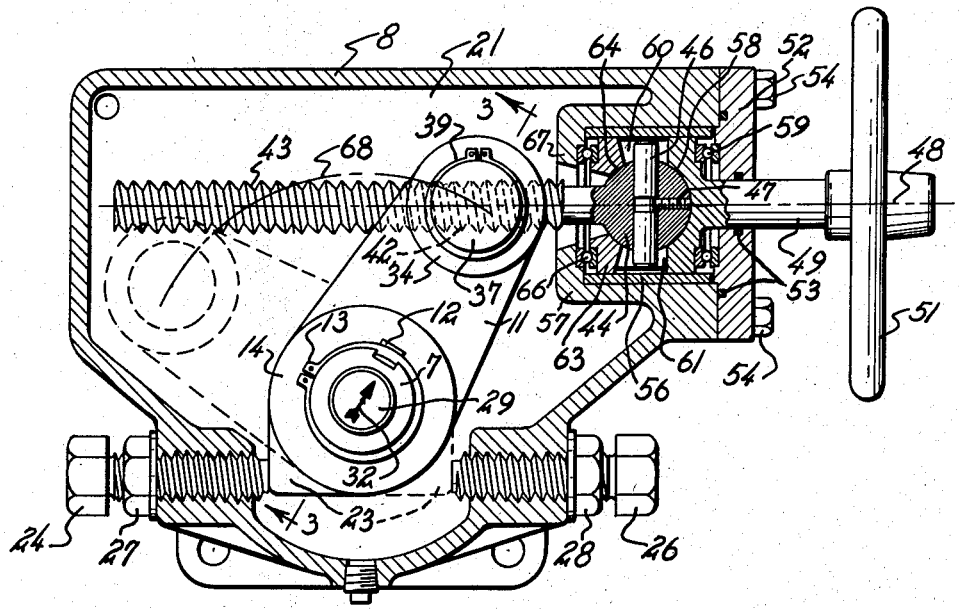
Figure 2:
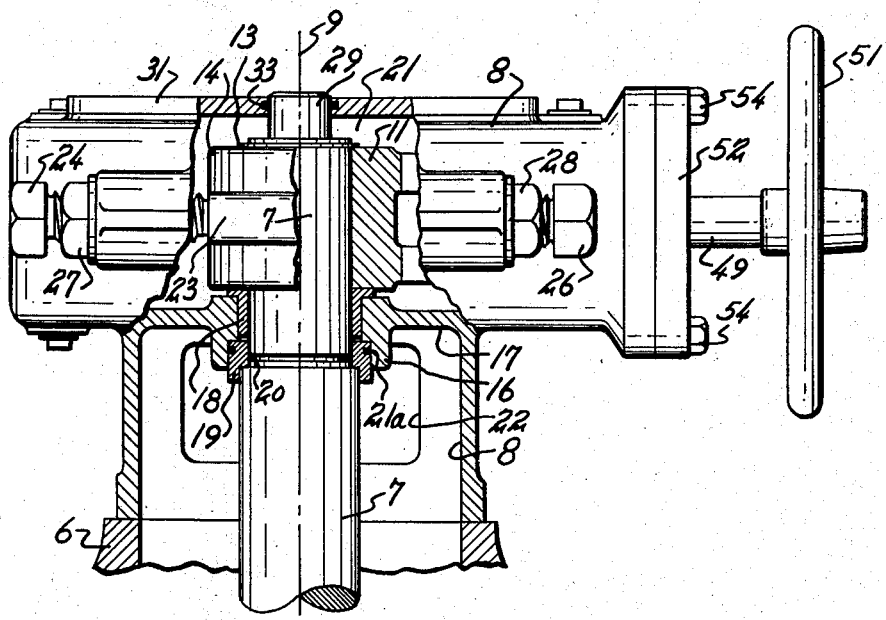
Figure 2 is, in part, a side elevation and in part a cross section on a diametrical plane through the valve operator of my invention.

In the customary case, the valve operator of the invention is for use with a valve (such as a butterfly valve, not shown) enclosed in a casing 6 from which a rotatable valve shaft 7 projects. The shaft 7 requires approximately 90° rotary motion for swinging the valve between fully open and fully closed positions. The shaft 7 is extended to lie within a housing 8 mounted on and secured to the casing 6 by any suitable means (not shown) so that the shaft 7 rotates about a first axis 9 relative to the casing 6 and to the housing 8.

The shaft 7 is provided with a lever 11 suitably secured on the shaft by a key 12 held by a retaining ring 13.

In order that the housing 8 can be suitably located and somewhat isolated from the casing 6 and that the lever 11 can be properly mounted, there is interposed between the hub 14 of the lever 11 and a boss 16 formed in a web 17 integral with the housing 8, a suitable journal and thrust bushing 18. A locating ring 19 sealed by a packing 20 and including a seal 21a is mounted in the boss 16 and isolates the chamber 21 within the housing 8 from the interior of the rest of the casing 6. This permits the retention of lubricant in the chamber 21 and the provision of inspection and hand openings 22 in the housing 8. In this fashion, the lever 11 is separately housed yet is accurately located with respect to the shaft 7 for swinging movement in an arcuate path in a plane normal to the first axis 9. The amount of swinging movement is conveniently limited by abutment of a projection 23 extending from the lever hub 14 to abut either one of two adjustable stop screws 24 and 26 threaded into the housing 8 and locked by appropriate nuts 27 and 28.

The shaft 7 is conveniently provided with a short extension 29 passing through the removable cover 31 of the housing 8 and carrying an indicating arrow 32 to show the particular position of the shaft 7 and correspondingly of the valve being controlled. A packing ring 33 precludes leakage.

The lever 11 at its outboard end is forked and both forks are provided with aligned passages forming a bearing 34 extending entirely therethrough and symmetrical about a second axis 36 parallel to the first axis 9. Rotatably disposed within the bearing 34 is a nut 37 having a circular cylindrical external contour forming a journal in the bearing. The nut has an enlargement 38 at one end and a retaining ring 39 at the other end so that it is axially confined with the forks of the lever 11, although with fair freedom of axial movement. The nut 37 is especially mounted for free rotation about the axis 36 within the lever 11.

Formed in the cylindrical nut 37 is a cross bore 41 having internal threads 42 therein. The cross bore 41 receives an intermediate or worm shaft 43 having external threads thereon engaging the threads 42. The shaft 43 passes freely between the forked ends of the lever 11. Adjacent one end, the worm shaft 43 is formed with a ball 44 having a cross pin 46 disposed on a diameter thereof and locked in place by a set screw 47. The center of the ball 44 lies on the axis 48 of a driving shaft 49 provided with an operator's hand wheel 51. The shaft 49 extends into the housing 8 through a removable cover 52 provided with packing rings 53, and held in place by cap screws 54.

The cover 52 itself holds in place an anti-friction liner 56 disposed within a sleeve 57 cast integrally within the housing 8 and surrounding the ball 44. One end of the driving shaft 49 is rotatably mounted within the anti-friction member 56 and is contoured to afford a spherical socket 58 engaging part of the ball 44. A thrust bearing 59 takes axial loads in one direction between the shaft 49 and the cover 52 of the housing 8 so that the ball 44 is fixed against axial translation in that direction.

So that the shaft 49 and the worm shaft 43 will rotate in unison, the enlarged end of the shaft 49 is provided with a pair of axially extending slots 60 and 61 the sides of which closely engage the extended ends of the cross pin 46.

A washer 63 is disposed within the anti-friction liner 56 and is contoured to provide a spherical socket 64 engaging another portion of the ball 44 and is backed by a thrust bearing 66 seated against an inturned flange 67 forming the end of the casing sleeve 57. The ball 44 and the cross pin 46 together with the attendant mechanism form a universal joint so that the rotation of the hand wheel 51 is transmitted with substantial accuracy to the worm shaft 43 while the worm shaft is held against translation along the axis 48 yet is free to swing in an arc in synchronism with the arcuate movement of the lever 11.

In the operation of the device, with the parts as shown in the full line position of Figure 1, the hand wheel is first rotated in an appropriate direction to rotate the shaft 49 so that, through the universal joint, the worm shaft 43 is similarly rotated. The angle between the line connecting the axis 9 and the axis 36 and the momentary rotational axis of the worm shaft is not particularly obtuse but approaches more nearly to a right angle so that a favorable leverage is had for opening the valve. Upon continued rotation of the hand wheel 51, the lever 11 is rotated, say to the left in Figure 1, thus appropriately turning the shaft 7. As the lever 11 rotates the nut 37 swings in an arcuate path 68 introducing appropriate angularity into the ball portion of the universal joint and thus maintaining the connection between the driven shaft and the drive shaft despite the angularity of the connecting mechanism. Continued motion of the hand wheel 51 eventually rotates the lever 11 into the dotted line position shown in Figure 1. In this positon, the shaft 7 has been rotated sufficiently to move the valve to its fully open position.

Upon reverse rotation of the hand wheel 51, the worm shaft 43 rotates reversely and by screwing the nut 37 back returns the lever toward the full line position, as shown in Figure 1. The closing leverage due to the favorable angularity is such that the valve is returned to its closed or seated position at a considerable mechanical advantage.

By the use of this mechanism and by adopting appropriately pitched threads on the worm shaft 43 and the nut 37, there is provided a valve operator which can be manually controlled (or driven by power if desired) with the frictional resistance of the parts largely minimized, with the nature of the individual parts relatively simple for economical and straightforward manufacture, and with the stresses on the various parts quite low so that their life is long and their service satisfactory and so that the maintenance and repair of the structure is simple and cheap.

What is claimed is:

1. A valve operator for a valve having a rotatable driven shaft, comprising; a housing around said driven shaft, a lever on said driven shaft within said housing, a cylindrical nut journalled in said lever and having a cross bore with threads therein, a worm shaft passing through said cross bore and engaging said threads, a ball on said worm shaft, a cross pin projecting from said ball substantially at a right angle to said worm shaft, a drive shaft, a body on said drive shaft forming a primary ball socket engaging part of said ball and defining a slot engaging said pin, a washer forming a secondary ball socket and engaging another part of said ball, and means on said housing for rotatably supporting said drive shaft thereon and for preventing translation of said body and said washer.

2. A valve operator for a valve having a driven shaft rotatable about a first axis, comprising a housing around said driven shaft, a lever fixed on said driven shaft, a nut journalled in said lever for rotation about a second axis parallel to said first axis, means forming a cross bore in said nut with threads therein, a worm shaft engaging said threads, a drive shaft, means for mounting said drive shaft in said housing against translation and for rotation solely about a third axis lying in a plane normal to said first axis, and a universal joint between and directly connected to said drive shaft and to said worm shaft.

3. A valve operator for a valve having a driven shaft rotatable about a first axis comprising a relatively stationary housing around said shaft, a lever fixed on said shaft, means forming a journal on said lever, a cylindrical nut rotatable in said journal about a second axis parallel to said first axis, means forming in said nut a cross bore having internal threads and symmetrical about a third axis lying in a plane normal to said first axis, a worm shaft having external threads engaging said internal threads, a universal joint, means for mounting said universal joint in said housing against translation and for rotation about a fourth axis lying substantially in said plane, means connecting said worm shaft and said universal joint, a driving shaft, means for mounting said driving shaft in said housing solely for rotation about said fourth axis, and means for connecting said driving shaft and said universal joint.

4. A valve operator for a valve having a driven shaft comprising a lever fixed on said driven shaft, a housing around said driven shaft and containing said lever, a cylindrical nut journalled in said lever and having a cross bore with threads therein, a worm shaft engaging said threads, a ball on said worm shaft, a cross pin piercing and projecting from said ball, a drive shaft, a body on said drive shaft having a slot receiving said cross pin and having a socket engaging said ball in one portion thereof, a member having a socket engaging another portion of said ball, and means in said housing mounting said body and said member against translation along the axis of said drive shaft and for rotation solely about said axis.

5. A valve operator for a valve comprising a driven shaft rotatable about a first axis, a lever fast on said driven shaft, a drive shaft rotatable about a second axis, a housing supporting said shafts in operating relationship and confining said driven shaft solely to rotation relative to said housing about said first axis and said drive shaft solely to rotation relative to said housing about said second axis, a universal joint immediately connected to said drive shaft, a worm shaft connected to said universal joint, and a nut journalled in said lever and engaging said worm shaft.

References Cited in the file of this patent

UNITED STATES PATENTS

| 1,528,359 | Alley | Mar. 3, 1925 |
| 2,293,797 | Bolton | Aug. 25, 1942 |
| 2,554,311 | Place | May 22, 1957 |
| 2,841,018 | Dickson | July 1, 1958 |

FOREIGN PATENTS

| 259,110 | Italy | June 15, 1928 |
| 754,018 | Germany | July 1, 1958 |